United States Patent [19]

Hines

[11] 4,266,279
[45] May 5, 1981

[54] MEMORY SYSTEM FOR A DOPPLER RADAR INCORPORATING A FAST FOURIER TRANSFORM COMPUTER

[75] Inventor: Kenneth W. Hines, Tempe, Ariz.

[73] Assignee: Motorola Inc., Schaumburg, Ill.

[21] Appl. No.: 25,313

[22] Filed: Mar. 29, 1979

[51] Int. Cl.³ .................... G06F 9/36; G06F 15/332
[52] U.S. Cl. ................................ 364/726; 343/5 DP; 343/5 FT; 364/900
[58] Field of Search ............... 364/724, 726, 900; 343/5 CF, 5 DP, 5 FT, 9 R

[56] References Cited

U.S. PATENT DOCUMENTS

| | | | |
|---|---|---|---|
| 3,633,173 | 1/1972 | Edge | 364/900 |
| 3,673,399 | 6/1972 | Hancke et al. | 364/726 |
| 3,686,490 | 8/1972 | Goldstone | 364/726 |
| 3,731,284 | 5/1973 | Thies | 364/726 X |
| 3,871,577 | 3/1975 | Avellar et al. | 364/726 |
| 3,988,601 | 10/1976 | Perry | 364/726 X |
| 4,075,630 | 2/1978 | Shapiro et al. | 343/5 FT X |
| 4,103,301 | 7/1978 | Evans | 343/5 CF X |

*Primary Examiner*—Jerry Smith
*Attorney, Agent, or Firm*—Eugene A. Parsons

[57] ABSTRACT

A data record memory system for use with a Doppler radar incorporating a fast Fourier transform computer wherein the memory system utilizes a single memory constructed to read out and write in data at each address and the data supplied to the memory is sequenced so that the data is read out of the memory system in numerical range bin order.

8 Claims, 7 Drawing Figures

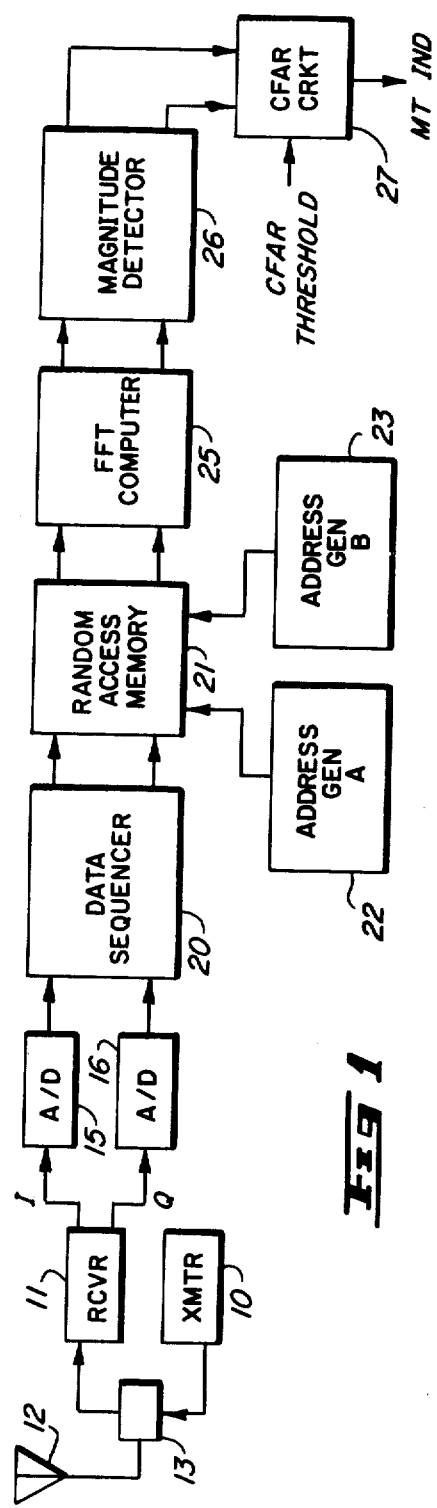
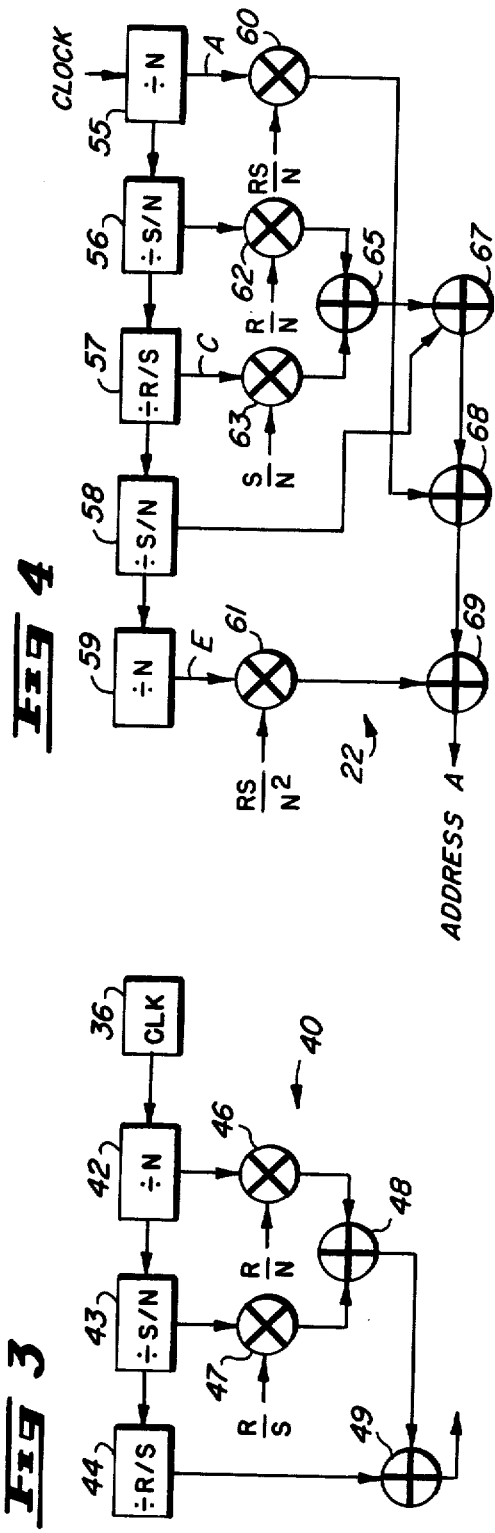

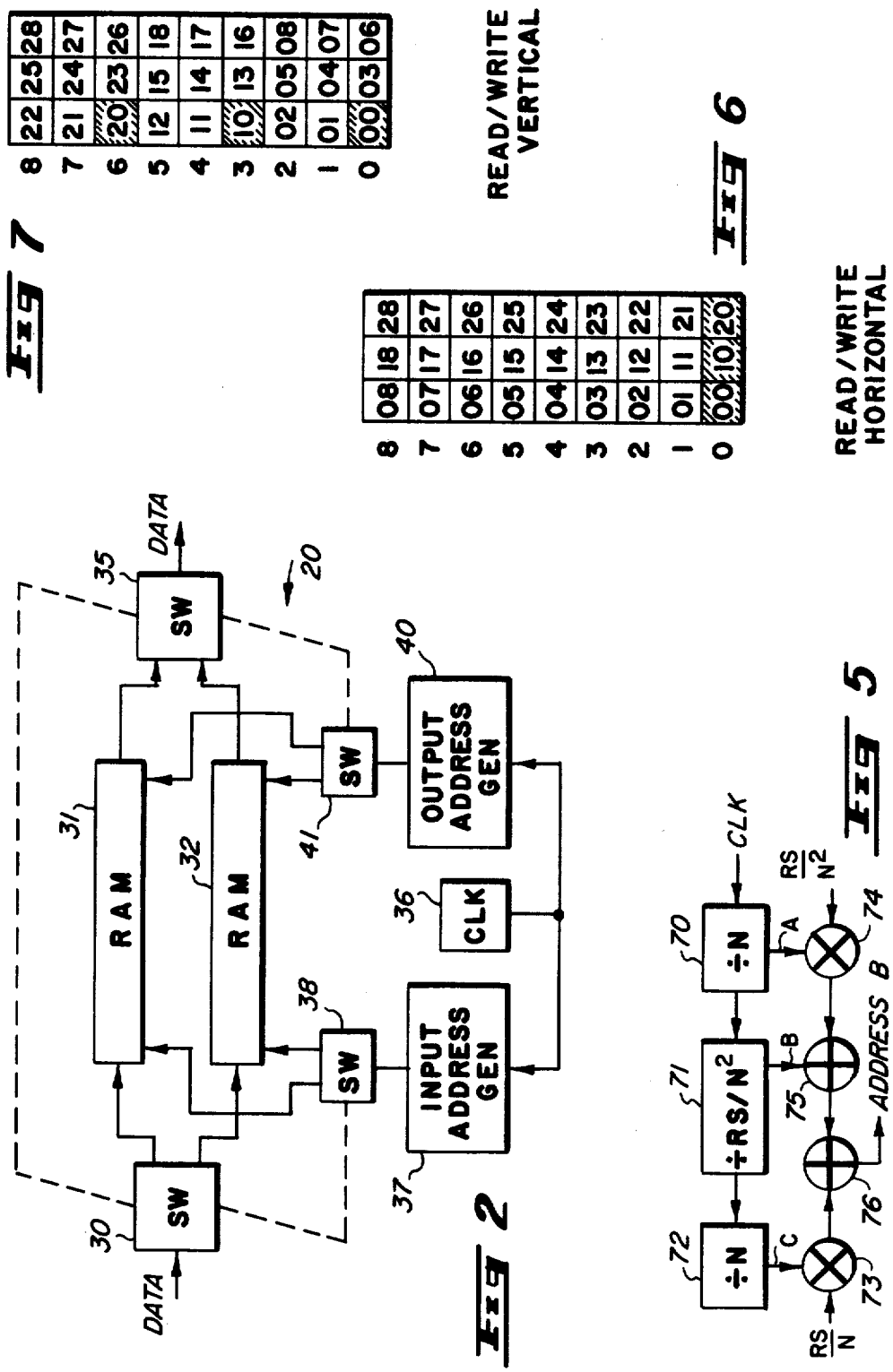

MEMORY SYSTEM FOR A DOPPLER RADAR INCORPORATING A FAST FOURIER TRANSFORM COMPUTER

BACKGROUND OF THE INVENTION

The transmitter of pulsed Doppler radars periodically transmits a pulse of energy, which is herein called a sample, and the receiver is constructed to separate the time between samples into a plurality of components herein called range bins. When a Fast Fourier Transform (FFT) computer is utilized with the Doppler radar, the information or data in a plurality of samples (and the component range bins), herein referred to as a batch, are stored and operated upon by the computer, in a predetermined sequence. Data is received sequentially by samples but is processed in a different order making it necessary to store a large amount of data in cases where the batch size is large. When a random access memory system is used for the storage of batch data, two such memories are generally used where real time processing is required. One of the memories is accessed by the FFT computer while the other is used for inputting the next batch of data.

Large random access memories are extremely expensive and, consequently, it is desirable to eliminate one of the memories in the FFT computer memory system. U.S. Pat. No. 3,633,173, entitled "Digital Scan Converter" and patented Jan. 4, 1972, discloses apparatus utilizing a single random access memory constructed and programmed to read out stored data and write in new data at the same address. However, this apparatus has two major drawbacks, one is that it only operates with a FFT computer having a radix of two and the other is that it does not read out the data sequentially in numerical range bin order. At the present time many Doppler radars utilizing FFT computers are also equipped with constant false alarm rate (CFAR) circuitry which requires data in numerical range bin order. Therefore, the apparatus disclosed in the '173 patent would not be operable in conjunction with CFAR circuitry.

SUMMARY OF THE INVENTION

The present invention pertains to Doppler radar utilizing a FFT computer, which computer incorporates a single random access memory constructed and programmed to read out stored data and write in new data at each address and further incorporating data sequencing circuitry supplying the data to the memory from the radar receiver in a predetermined sequence so that the data is supplied to the fast Fourier transform computer in numerical range bin order. The data sequencer and address generators for the single memory are described in general terms so that a FFT computer with substantially any radix, within certain constraints dictated by the size of the batch selected, may be utilized.

It is an object of the present invention to provide a new and improved data record memory system for a Doppler radar utilizing a fast Fourier transform computer.

It is a further object of the present invention to provide a new and improved data record memory system for a fast Fourier transform computer wherein a single random access memory is programmed to read out stored data in numerical range bin order and to write in new data at each address as the stored data is read out.

It is a further object of the present invention to provide a new and improved data record memory system for use with a fast Fourier transform computer, which system can be constructed to operate with substantially any radix within the constraints of a selected batch of data.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the Figures:

FIG. 1 is a block diagram of a Doppler radar including a FFT computer with a data record memory system incorporating an embodiment of the present invention;

FIG. 2 is a detailed block diagram of the data sequencer of FIG. 1;

FIG. 3 is a flow diagram for the output address generator of FIG. 2;

FIG. 4 is a flow diagram for the address generator A of FIG. 1;

FIG. 5 is a flow diagram for the address generator B of FIG. 1;

FIG. 6 illustrates the position of data stored in the random access memory during alternate batches; and FIG. 7 illustrates the position of data stored in the random access memory during every other batch.

DESCRIPTION OF THE PREFERRED EMBODIMENT

Referring specifically to FIG. 1, a pulsed Doppler radar transmitter 10 and receiver 11 are connected to an antenna 12 by means of a duplexer, circulator or the like 13. As is well known in the art and for reasons not forming a portion of this invention, the output of the receiver 11 is divided into an in-phase (I) portion of the output signal and a quadrature (Q) portion of the output signal.

The I and Q portions of the data from the receiver 11 are applied through the analog-to-digital converters 15 and 16, combined into a single complex data word, and input to the data sequencer 20. The data sequencer 20 is illustrated in detail in FIG. 2 and will be described presently in conjunction therewith. The data from the sequencer 20 is applied to a random access memory circuit 21 in accordance with a pair of address generators 22 and 23. Generator 22 may be utilized to generate read/write addresses for either the odd or the even batches of data supplied to the memory 21 and the generator 23 is used to generate the addresses for the other of the odd or even batches. For example, generator 22 may generate the address for all odd batches of data (first, third, fifth, etc.) and generator 23 may be used to generate the addresses for all even batches of data (second, fourth, sixth, etc.). Data appearing at the output of the random access memory 21 in numerical range bin order is applied to an input of a FFT computer 25. The output of the computer 25 is supplied through a magnitude detector 26 to a constant false alarm rate (CFAR) circuit 27 having a CFAR threshold applied thereto and supplying a moving target indication at an output thereof. Since the FFT computer and CFAR circuit do not form a portion of this invention, further detail as to the construction or operation thereof is not included herewith.

To describe the construction and operation of the present invention, the following letters are utilized to designate certain variable quantities. The letter N designates the radix, or the number of complex data words required by the first stage function of the FFT computer 25. The letter S indicates the number of samples (transmitter pulses) included in a single batch of data and the letter R indicates the number of range bins in each sample. Typically, the number of samples, S, in a batch of data will be relatively high (e.q. 48) and the number of range bins per sample will be very high (e.q. 2048) but relatively small numbers are utilized in this discussion for simplicity. There are two conditions which must be complied with in the present system. The first is that the number of samples must be an integer multiple of the radix of the FFT computer 25 and the second is that the number of range bins per sample must be an integer multiple of the number of samples. In the present embodiment the radix, N, is 3, the number of samples, S, is 3 and the number of range bins per sample, R, is 9.

Referring specifically to FIG. 2, a somewhat more detailed block diagram of the data sequencer 20 is illustrated. The data from the analog-to-digital converters 15, after being combined, is applied through a first switch 30 to either of a pair of random access memories 31 or 32. The random access memories 31 and 32 are simple memories generally capable of storing the data in all of the range bins of a single sample. The data is written into one of the memories 31 or 32 while data stored in the other memory 31 or 32 is being read out in a predetermined sequence. The output of the memories 31 and 32 is connected through a second switch 35 to the output of the data sequencer 20. The switches 30 and 35 are connected so that data is supplied to one memory and received from the other memory. A clock 36 supplies pulses to an input address generator 37 which is connected through a switch 38 to the memories 31 and 32 and sequencially clocks data into the memory selected for receiving the input data. The clock 36 also supplies pulses to an output address generator 40 which is connected through a switch 41 to the memories 31 and 32 and supplies addresses to the memory 31 or 32 so that data is read therefrom in the predetermined sequence. A flow diagram for the output address generator 40 is illustrated in FIG. 3.

In FIG. 3, the clock 36 supplies pulses to a circuit 42 designed to divide the clock pulses by a number equal to the radix of the computer 25. The output of the circuit 42 is applied to a second circuit 43 designed to divide the output by a number equal to the ratio of the samples to the radix. The output of the circuit 43 is connected to a circuit 44 designed to divide the output by a number equal to the ratio of the range bins to the samples. The output of the circuit 42 is connected to a circuit 46 which multiplies the output of the circuit 42 by a number equal to the ratio of the range bins to the radix. The output of the circuit 43 is connected to a circuit 47 which multiplies the output by a number equal to the ratio of the range bins to the samples. The outputs of the circuits 46 and 47 are added together in a circuit 48 and the output thereof is added to the output of the circuit 44 in a circuit 49. The output of the circuit 49 is a plural line address to either of the memories 31 or 32. In the present embodiment the number of range bins is nine so that a 4-bit word is required to address the memories 31 or 32 and, therefore, a four line output would be supplied from circuit 49 to the memory 31 or 32. In this fashion, the data from the memory 31 or 32 which is applied to the memory circuit 21 of the memory system is supplied in a predetermined sequence which will be explained presently.

A chart A constructing aid is set forth below

| Sample Out | | | | |
|---|---|---|---|---|
| 2 | 1 | 0 | | |
| 6 | 3 | 0 | 0 | |
| 7 | 4 | 1 | 1 | Group |
| 8 | 5 | 2 | 2 = R/S − 1 | |
| Range Bin In | | | | | and is designed for illustrating the predetermined sequence of the data eminating from the data sequencer 20. The aid includes an angular line with a column of numbers at the right-hand side thereof the largest of which is 1 less than the ratio of range bins to samples, which in the present example is 3. A row of numbers above the lines represents the samples out of the memory 21 and the three columns of numbers within the angle represent the range bins into the memory 21 or out of the sequencer 20. A chart A devised from the above aid is set forth below.

CHART A

| DATA IN | | | DATA OUT | |
|---|---|---|---|---|
| Sample | Range Bin | | Sample | Range Bin |
| 0 | 0 | | 0 | 0 |
| 0 | 3 | Group 0 | 1 | 0 |
| 0 | 6 | | 2 | 0 |
| 0 | 1 | | 0 | 1 |
| 0 | 4 | Group 1 | 1 | 1 |
| 0 | 7 | | 2 | 1 |
| 0 | 2 | | 0 | 2 |
| 0 | 5 | Group 2 | 1 | 2 |
| 0 | 8 | | 2 | 2 |
| 1 | 0 | | 0 | 3 |
| 1 | 3 | Group 0 | 1 | 3 |
| 1 | 6 | | 2 | 3 |
| 1 | 1 | | 0 | 4 |
| 1 | 4 | Group 1 | 1 | 4 |
| 1 | 7 | | 2 | 4 |
| 1 | 2 | | 0 | 5 |
| 1 | 5 | Group 2 | 1 | 5 |
| 1 | 8 | | 2 | 5 |
| 2 | 0 | | 0 | 6 |
| 2 | 3 | Group 0 | 1 | 6 |
| 2 | 6 | | 2 | 6 |
| 2 | 1 | | 0 | 7 |
| 2 | 4 | Group 1 | 1 | 7 |
| 2 | 7 | | 2 | 7 |
| 2 | 2 | | 0 | 8 |
| 2 | 5 | Group 2 | 1 | 8 |
| 2 | 8 | | 2 | 8 |

In the chart A, the left two columns of numbers represent data in and are samples and range bins, respectively. The right two columns of numbers represent data out and indicate samples and range bins, respectively. Since the first, or zero, sample has nine range bins therein, the first nine samples of the data in column one of the chart A will be 0's, the second nine will be 1's and the third nine will be 2's with the fourth nine being 0's again and so on. referring to the chart A construction aid and reading the rows under the angle horizontally, starting from the top, the sequence of the range bins for the data in column two of the chart A can be devised. In the present example, the first three range bins are 0, 3, 6; the second three range bins are 1, 4, 7; and the third three range bins are 2, 5, 8. The range bins continue to repeat in this sequence. The order in which the range bin data are output from the data sequencer 20 is determined by the order in which the samples for a given range bin are processed by the FFT computer. In the example, all 3 samples 0, 1, 2 are required for each FFT operation with 1 FFT operation required for each range bin. If 6 samples were required instead of 3 then 2 FFT operations would be required for each range bin. The first would operate on samples 0, 2, 4 and the second would operate on samples 1, 3, 5. In this case the chart constructing aid is as set forth below for R=12.

| | | SAMPLE OUT | | | | |
|---|---|---|---|---|---|---|
| 5 | 4 | 3 | 2 | 1 | 0 | |
| 10 | 8 | 6 | 4 | 2 | 0 | 0 Group |
| 11 | 9 | 7 | 5 | 3 | 1 | 1 = 12/6 −1 |

The first 2 sections of a DATA IN/DATA OUT chart B are set forth below.

Chart B

| DATA IN | | | DATA OUT | |
|---|---|---|---|---|
| Sample | Range Bin | | Sample | Range Bin |
| 0 | 0 | | 0 | 0 |
| 0 | 4 | | 2 | 0 |
| 0 | 8 | Group 0 | 4 | 0 |
| 0 | 2 | | 1 | 0 |
| 0 | 6 | | 3 | 0 |
| 0 | 10 | | 5 | 0 |
| 0 | 1 | | 0 | 1 |
| 0 | 5 | | 2 | 1 |
| 0 | 9 | Group 1 | 4 | 1 |
| 0 | 3 | | 1 | 1 |
| 0 | 7 | | 3 | 1 |
| 0 | 11 | | 5 | 1 |

The general method for determining the sample processing sequence as a function of radix and number of samples is well known and does not form a portion of this invention. Once the sample sequence is determined then the range bin sequence out of the sequencer (20) is determined from the chart construction aid as follows. The first section comprises the range bins in group 0. The range bin sequence is then taken from the columns headed by the sample number in the order of the sample sequence. The second section comprises the range bins in group 1. After all groups have been used the process is repeated beginning with group 0.

Thus, referring to the data out columns of the chart A it can be seen that the range bins will be supplied to the computer 25 from the memory 21 in numerical range bin order, i.e. the zero$^{th}$ range bin of the three samples will be supplied to the computer 25 first, then the first range bin for each of the samples, etc.

Referring to FIG. 4, a general flow chart is illustrated for the address generator 22 of the random access memory 21. In FIG. 4 clock pulses are applied to a first circuit 55 which is constructed to divide the clock pulses by the radix of the computer 25. The output of the first circuit 55 is applied to a second circuit 56 which is designed to divide the output by the ratio of the samples to the radix. The output of the circuit 56 is applied to a circuit 57 which is designed to divide the output by the ratio of the range bins to the samples. The output of the circuit 57 is connected to a circuit 58 which is designed to divide the output by the ratio of the samples to the radix. The output of the circuit 58 is connected to a circuit 59 which is designed to divide the output by a number equal to the radix of the computer 25. The output of the circuit 55 is also applied to a circuit 60 which multiplies the output by a number equal to the ratio of the product of range bins times samples to the radix of the computer 25. The output of the circuit 59 is applied to a circuit 61 which multiplies the output by a number equal to the ratio of the product of range bins times samples to the square of the radix of the computer 25. The output of the circuit 56 is multiplied by a number equal to the ratio of range bins to the radix in a circuit 62. The output of the circuit 57 is also applied to a circuit 63 which multiplies the output by a number equal to the ratio of samples to radix and the outputs of the circuits 62 and 63 are added together in a circuit 65. The output of the circuit 58 is applied to a circuit 67 which adds the output with the output of the circuit 65 and supplies an output to a third adder 68 which adds the output of the circuit 67 to the output of the circuit 60. A fourth adder 69 adds the outputs of the circuits 68 and 61 and provides an output, which is a plural line address, to the memory circuit 21.

Referring to FIG. 5, a general flow diagram for the address generator 23 of the random access memory 21 is illustrated. In FIG. 5 clock pulses are applied to a first circuit 70 which is designed to divide the clock pulses by a number equal to the radix of the computer 25. The output of the first circuit 70 is supplied to a second circuit 71 which is designed to divide the output by the ratio of the product of range bins and samples to the square of the radix. The output of the second circuit 71 is supplied to a third circuit 72 which is designed to divide the output by a number equal to the radix. The output of the third circuit 72 is applied to a circuit 73 which multiplies the output by a number equal to the ratio of the product of range bins times samples to the radix of the computer 25. The output of the first circuit 70 is supplied to a circuit 74 which multiplies the output by a number equal to the ratio of the product of range bins times samples to the square of the radix of the computer 25. The output of the second circuit 71 is applied to an adder 75 which adds the outputs of the circuits 71 and 74. A second adder 76 adds the outputs of the circuits 73 and 75 and provides an output, which is a plural line address, to the memory circuit 21.

FIGS. 6 and 7 are representative of the memory 21 and illustrate two different sequences of addresses or positions for data in the random access memory 21. Each of the squares is representative of an address or location for storing data, with the 27 locations being identified by sequential numbers 0 through 26 starting at the lower left corner and progressing upward by columns to the first square (26) in the upper right corner of the third column. The locations are portrayed with data stored therein represented by a two digit number (as in the "out" and "in" columns of chart C), the first digit of each of the numbers in the squares represents a specific sample while the second digit of the numbers represents a specific range bin in that sample.

Chart C

| | ADDRESS GENERATOR 22 | | | | | | | | |
|---|---|---|---|---|---|---|---|---|---|
| | | | | | | | Data OUT | | Data IN |
| Clock | E*3 | + | C | + | A*9 | Location | S | R | S | R |
| 0 | 0 | | 0 | | 0 | 0 | 0 | 0 | 0 | 0 |
| 1 | 0 | | 0 | | 9 | 9 | 1 | 0 | 0 | 3 |
| 2 | 0 | | 0 | | 18 | 18 | 2 | 0 | 0 | 6 |
| 3 | 0 | | 1 | | 0 | 1 | 0 | 1 | 0 | 1 |
| 4 | 0 | | 1 | | 9 | 10 | 1 | 1 | 0 | 4 |
| 5 | 0 | | 1 | | 18 | 19 | 2 | 1 | 0 | 7 |
| 6 | 0 | | 2 | | 0 | 2 | 0 | 2 | 0 | 2 |
| 7 | 0 | | 2 | | 9 | 11 | 1 | 2 | 0 | 5 |

Chart C -continued

ADDRESS GENERATOR 22

| Clock | E*3 | + | C | + | A*9 | Location | Data OUT S | R | Data IN S | R |
|---|---|---|---|---|---|---|---|---|---|---|
| 8 | 0 | | 2 | | 18 | 20 | 2 | 2 | 0 | 8 |
| 9 | 3 | | 0 | | 0 | 3 | 0 | 3 | 1 | 0 |
| 10 | 3 | | 0 | | 9 | 12 | 1 | 3 | 1 | 3 |
| 11 | 3 | | 0 | | 18 | 21 | 2 | 3 | 1 | 6 |
| 12 | 3 | | 1 | | 0 | 4 | 0 | 4 | 1 | 1 |
| 13 | 3 | | 1 | | 9 | 13 | 1 | 4 | 1 | 4 |
| 14 | 3 | | 1 | | 18 | 22 | 2 | 4 | 1 | 7 |
| 15 | 3 | | 2 | | 0 | 5 | 0 | 5 | 1 | 2 |
| 16 | 3 | | 2 | | 9 | 14 | 1 | 5 | 1 | 5 |
| 17 | 3 | | 2 | | 18 | 23 | 2 | 5 | 1 | 8 |
| 18 | 6 | | 0 | | 0 | 6 | 0 | 6 | 2 | 0 |
| 19 | 6 | | 0 | | 9 | 15 | 1 | 6 | 2 | 3 |
| 20 | 6 | | 0 | | 18 | 24 | 2 | 6 | 2 | 6 |
| 21 | 6 | | 1 | | 0 | 7 | 0 | 7 | 2 | 1 |
| 22 | 6 | | 1 | | 9 | 16 | 1 | 7 | 2 | 4 |
| 23 | 6 | | 1 | | 18 | 25 | 2 | 7 | 2 | 7 |
| 24 | 6 | | 2 | | 0 | 8 | 0 | 8 | 2 | 2 |
| 25 | 6 | | 2 | | 9 | 17 | 1 | 8 | 2 | 5 |
| 26 | 6 | | 2 | | 18 | 26 | 2 | 8 | 2 | 8 |

Thus, referring to FIG. 6 and assuming the data indicated in the Figure has been previously stored in the random access memory 21 as shown, the data is located sequentially in columns as it is received from the radar, i.e. nine sequential range bins, 0-8, of the first sample, 0, are stored in the first column at the left of the Figure starting from the bottom. The address generator 22 generates a sequence of addresses, as shown in chart C, which are applied to the memory 21 and dictate the sequence of addresses for reading out the stored data and writing in new data. Further, the data applied to the memory by the sequencer 20 will be in the sequence set forth in the chart A above. The chart C illustrates the addresses generated by the generator 22 for each clock pulse. For purposes of illustration in the chart C, the outputs of circuits 55, 57 and 59 are labeled A, C and E, respectively. No outputs are shown for circuits 56 and 58 since they are equal to 1 and can be ignored for the Example (radix 3, sample 3 and range bin 9) being used herein.

Since the computer 25 has a radix of 3, three data words are output from the memory for each FFT operation. The address generator 22 generates the three corresponding addresses representative of three horizontal squares in FIG. 6. In the first step the first three squares at the bottom of FIG. 6 (see the crosshatched squares) will be addressed and the data therein will be read out while the first three words of data from the sequencer 20 (group 0) will be written into the memory at these addresses. Thus, the data read out will be sample 0 range bin 0, sample 1 range bin 0, sample 2 range bin 0 and the information written into these addresses (see FIG. 7 and chart C) will be the data in sample 0 range bin 0, sample 0 range bin 3 and sample 0 range bin 6. In the second step the next three horizontal squares will be read out and the first group 1 from the chart A will be written into these addresses. This procedure will continue until all of the addresses of FIG. 6 have been read out and all of the information shown in FIG. 7 is written into the memory.

When the batch of data described above is completely read out and the new batch is written into the memory 21 the address generator 22 will be disconnected and the address generator 23 will operate the random access memory 21. The address generator 23 generates a sequence of addresses, as shown in chart D, which are applied to the memory 21 as explained for the generator 22. During this operation the three squares of FIG. 7 which are cross hatched will be read out during the first step and the first group 0 information from the above chart A will be written into the memory at these addresses. Thus, the data supplied to the computer 25 will be data in sample 0 range bin 0, sample 1 range bin 0, and sample 2 range bin 0. For the second step the address generator moves each of the three outputs up one square in the first column of FIG. 7 so that the data read out will be the data carried in sample 0 range bin 1, sample 1 range bin 1 and sample 2 range bin 1. This procedure will continue until all of the data of FIG. 7 is read out of the memory and a new batch of data is written into the memory as illustrated in FIG. 6.

Chart E further illustrates data locations for two batches, A and B, of data.

Chart D

| LOC | A S | A R | B S | B R | LOC | A S | A R | B S | B R | LOC | A S | A R | B S | B R |
|---|---|---|---|---|---|---|---|---|---|---|---|---|---|---|
| 0 | 0 | 0 | 0 | 0 | 9 | 1 | 0 | 0 | 3 | 18 | 2 | 0 | 0 | 6 |
| 1 | 0 | 1 | 0 | 1 | 10 | 1 | 1 | 0 | 4 | 19 | 2 | 1 | 0 | 7 |
| 2 | 0 | 2 | 0 | 2 | 11 | 1 | 2 | 0 | 5 | 20 | 2 | 2 | 0 | 8 |

ADDRESS GENERATOR 23

| Clock | C*9 | + | B | + | A*3 | LOCATION | Data OUT S | R | Data IN S | R |
|---|---|---|---|---|---|---|---|---|---|---|
| 0 | 0 | | 0 | | 0 | 0 | 0 | 0 | 0 | 0 |
| 1 | 0 | | 0 | | 3 | 3 | 1 | 0 | 0 | 3 |
| 2 | 0 | | 0 | | 6 | 6 | 2 | 0 | 0 | 6 |
| 3 | 0 | | 1 | | 0 | 1 | 0 | 1 | 0 | 1 |
| 4 | 0 | | 1 | | 3 | 4 | 1 | 1 | 0 | 4 |
| 5 | 0 | | 1 | | 6 | 7 | 2 | 1 | 0 | 7 |
| 6 | 0 | | 2 | | 0 | 2 | 0 | 2 | 0 | 2 |
| 7 | 0 | | 2 | | 3 | 5 | 1 | 2 | 0 | 5 |
| 8 | 0 | | 2 | | 6 | 8 | 2 | 2 | 0 | 8 |
| 9 | 9 | | 0 | | 0 | 9 | 0 | 3 | 1 | 0 |
| 10 | 9 | | 0 | | 3 | 12 | 1 | 3 | 1 | 3 |
| 11 | 9 | | 0 | | 6 | 15 | 2 | 3 | 1 | 6 |
| 12 | 9 | | 1 | | 0 | 10 | 0 | 4 | 1 | 1 |
| 13 | 9 | | 1 | | 3 | 13 | 1 | 3 | 1 | 3 |
| 14 | 9 | | 1 | | 6 | 16 | 2 | 4 | 1 | 7 |
| 15 | 9 | | 2 | | 0 | 11 | 0 | 5 | 1 | 2 |

Chart D -continued

| | | | | | | | | |
|---|---|---|---|---|---|---|---|---|
| 16 | 9  | 2 | 3 | 14 | 1 | 5 | 1 | 5 |
| 17 | 9  | 2 | 6 | 17 | 2 | 5 | 1 | 8 |
| 18 | 18 | 0 | 0 | 18 | 0 | 6 | 2 | 0 |
| 19 | 18 | 0 | 3 | 21 | 1 | 6 | 2 | 3 |
| 20 | 18 | 0 | 6 | 24 | 2 | 6 | 2 | 6 |
| 21 | 18 | 1 | 0 | 19 | 0 | 7 | 2 | 1 |
| 22 | 18 | 1 | 3 | 22 | 1 | 7 | 2 | 4 |
| 23 | 18 | 1 | 6 | 25 | 2 | 7 | 2 | 7 |
| 24 | 18 | 2 | 0 | 20 | 0 | 8 | 2 | 2 |
| 25 | 18 | 2 | 3 | 23 | 1 | 8 | 2 | 3 |
| 26 | 18 | 2 | 6 | 26 | 2 | 8 | 2 | 8 |

Chart E

| | | | | | | | | | | | | | |
|---|---|---|---|---|---|---|---|---|---|---|---|---|---|
| 3 | 0 | 3 | 1 | 0 | 12 | 1 | 3 | 1 | 3 | 21 | 2 | 3 | 1 | 6 |
| 4 | 0 | 4 | 1 | 1 | 13 | 1 | 4 | 1 | 4 | 22 | 2 | 4 | 1 | 7 |
| 5 | 0 | 5 | 1 | 2 | 14 | 1 | 5 | 1 | 5 | 23 | 2 | 5 | 1 | 8 |
| 6 | 0 | 6 | 2 | 0 | 15 | 1 | 6 | 2 | 3 | 24 | 2 | 6 | 2 | 6 |
| 7 | 0 | 7 | 2 | 1 | 16 | 1 | 7 | 2 | 4 | 25 | 2 | 7 | 2 | 7 |
| 8 | 0 | 8 | 2 | 2 | 17 | 1 | 8 | 2 | 5 | 26 | 2 | 8 | 2 | 8 |

Referring to chart E it can be seen that sample 1 of range bin 2 for batch A is obtained from location 11 and is replaced by range bin 5 of sample 0 for batch B. Similarly, sample 0 of range bin 5 for batch A is obtained from location 5 and is replaced by range bin 2 of sample 1 for batch B. After batch A has been processed the roles of batch A and batch B are reversed. Now sample 1 of range bin 2 for batch B is obtained from location 5 and is replaced by range bin 5 of sample 0 for the next batch (A). Similarly, sample 0 of range bin 5 for batch A is obtained from location 11 and is replaced by range bin 2 of sample 1 for the next batch (A).

A partitioning of the batch memory into an NxN array is inherent in the design of the address generators. This is particularly significant where speed requires that N complex data words be read in parallel. In this case the batch memory is designed as an NxN array of sub-memories. As a practical matter, when this is done the multiplying factors $R*S/N^2$ and $R*S/N$, if not already a power of 2 should be changed to the closest power of 2 which is higher than the corresponding factor. In the case given $R*S/N^2 = 3$ should be replaced by 4 and $R*S/N = 9$ by 16. The memory organization corresponding to these changes is set forth in chart F below.

Chart F further illustrates data locations for two batches, A and B, of data where memory 21 is a 3×3 array of sub-memories.

Chart F

| LOC | A | | B | | LOC | A | | B | | LOC | A | | B | |
|---|---|---|---|---|---|---|---|---|---|---|---|---|---|---|
| | S | R | S | R | | S | R | S | R | | S | R | S | R |
| 0  | 0 | 0 | 0 | 0 | 16 | 1 | 0 | 0 | 3 | 32 | 2 | 0 | 0 | 6 |
| 1  | 0 | 1 | 0 | 1 | 17 | 1 | 1 | 0 | 4 | 37 | 2 | 1 | 0 | 7 |
| 2  | 0 | 2 | 0 | 2 | 18 | 1 | 2 | 0 | 5 | 24 | 2 | 2 | 0 | 8 |
| 4  | 0 | 3 | 1 | 0 | 20 | 1 | 3 | 1 | 3 | 36 | 2 | 3 | 1 | 6 |
| 5  | 0 | 4 | 1 | 1 | 21 | 1 | 4 | 1 | 4 | 37 | 2 | 4 | 1 | 7 |
| 6  | 0 | 5 | 1 | 2 | 22 | 1 | 5 | 1 | 5 | 38 | 2 | 5 | 1 | 8 |
| 8  | 0 | 6 | 2 | 0 | 24 | 1 | 6 | 2 | 3 | 40 | 2 | 6 | 2 | 6 |
| 9  | 0 | 7 | 2 | 1 | 25 | 1 | 7 | 2 | 4 | 41 | 2 | 7 | 2 | 7 |
| 10 | 0 | 8 | 2 | 2 | 26 | 1 | 8 | 2 | 5 | 42 | 2 | 8 | 2 | 8 |

When organized in this manner, the matrix of sub-memories is accessed on a row basis for batches A and on a column basis for batches B. Thus, the address sequence will continue to alternate between the positions illustrated in FIG. 6 and FIG. 7 and the data supplied to the computer 25 will be in numerical range bin order.

Thus, a data record memory system for use with a Doppler radar incorporating a FFT computer is illustrated which is capable of storing information from the radar receiver in a single random access memory and supplying the information from the memory to the FFT computer in numerical range bin order. Further, the memory system can be constructed to accommodate substantially any radix of the computer 25 within the constraints of the samples and range bins per sample in a single batch of data. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A fast Fourier transform computer with a predetermined radix utilized in conjunction with a Doppler radar and incorporating a data record memory system for receiving and storing a batch of data, a batch of data including a predetermined number of radar samples and a substantially larger predetermined number of range bins per sample, and reading out the stored batch of data in numercial range bin order, said memory system comprising:

(a) a random access memory being sufficiently large to store a batch of data and connected to write data for storage and substantially simultaneously read output data at each selected address of said memory;

(b) data sequencing circuitry for receiving data from the radar and supplying the data to the random access memory in a predetermined sequence; and (c) address selection means connected to said random access memory for selecting the addresses therein in a sequence that operates in conjunction with the predetermined sequence of received data to read data out in numerical range bin order.

2. A memory system as claimed in claim 1 wherein the data sequencing circuitry includes random access memory means and an address generator for storing the data and supplying the data at an output in the predetermined sequence.

3. A memory system as claimed in claim 2 wherein the random access memory means includes two random access memories and switching means connected to alternately write data into one memory while stored data is read out of the other memory.

4. A memory system as claimed in claim 3 wherein data from the Doppler radar is written into one of the memories in the order it is received and read out of the other memory in the predetermined sequence dictated by the address generator.

5. A memory system as claimed in claim 2 wherein the address generator includes clock means providing clock pulses at a predetermined frequency, first means for providing an output signal equal to the clock pulses divided by a number equal to the radix of the computer, second means connected to provide an output signal equal to the output signal of said first means divided by the ratio of samples to the radix, third means connected to provide an output signal equal to the output signal of said second means divided by the ratio of range bins to samples, fourth means connected to provide an output signal equal to the sum of the output signal of said first means multiplied by the ratio of range bins to the radix and the output signal of said second means multiplied by the ratio of range bins to samples, and fifth means connected to provide an address signal equal to the sum of the output signals of said third means and said fourth means.

6. A memory system as recited in claim 1 wherein the address selection means includes a first address generator for providing the sequence of reading/writing alternate batches of data and a second address generator for providing the sequence of reading/writing the remaining batches of data, said first address generator being programmed to read/write by columns and said second address generator being programmed to read/write by rows.

7. A memory system as claimed in claim 6 wherein the first address generator includes clock means providing clock pulses at a predetermined frequency, first means for providing an output signal equal to the clock pulses divided by a number equal to the radix of the computer, second means connected to provide an output signal equal to the output signal of said first means divided by the ratio of samples to the radix, third means connected to provide an output signal equal to the output signal of said second means divided by the ratio of range bins to samples, fourth means connected to provide an output signal equal to the output signal of said third means divided by the ratio of samples to the radix, fifth means connected to provide an output signal equal to the output signal of said fourth means divided by a number equal to the radix of the computer, sixth means connected to provide an output signal equal to the sum of the output signal of said second means multiplied by the ratio of range bins to the radix and the output signal of said third means multiplied by the ratio of samples to the radix, seventh means connected to provide an output signal equal to the sum of the output signals of said sixth means and said fourth means, eighth means connected to provide an output signal equal to the sum of the output of said first means multiplied by a number equal to the ratio of the product of range bins and samples to the radix and the output of said seventh means, and ninth means connected to provide an output signal equal to the sum of the output of said fifth means multiplied by a number equal to the ratio of the product of range bins and samples to the square of the radix and the output of said eighth means.

8. A memory system as claimed in claim 6 wherein the second address generator includes clock means providing clock pulses at a predetermined frequency, first means for providing an output signal equal to the clock pulse divided by a number equal to the radix of the computer, second means connected to provide an output signal equal to the output signal of said first means divided by the ratio of the product of range bins and samples to the square of the radix, third means connected to provide an output signal equal to the output signal of said second means divided by a number equal to the radix of the computer, fourth means connected to provide an output signal equal to the sum of the output of said first means multiplied by a number equal to the ratio of the product of range bins and samples to the square of the radix and the output of said second means, and fifth means connected to provide an output signal equal to the sum of the output of said third means multiplied by a number equal to the ratio of the product of range bins and samples to the radix and the output of said fourth means.

* * * * *